United States Patent [19]

van Zyl

[11] 4,075,786
[45] Feb. 28, 1978

[54] CONTAINER FOR SAFELY RETAINING A LIVING PLANT DURING TRANSIT AND DISPLAY

[76] Inventor: Bernard van Zyl, 105 Pineneedle Lane, Altamonte Springs, Fla. 32701

[21] Appl. No.: 708,271

[22] Filed: Jul. 23, 1976

[51] Int. Cl.² ............................................. A01G 9/02
[52] U.S. Cl. ........................................ 47/84; 206/423; 206/813; 53/139.3; 53/42; 53/330; 53/383
[58] Field of Search .................... 47/84, 29; 206/423, 206/813; 53/128, 139.3, 287, 330, 383, 3, 38, 35, 42

[56] References Cited

U.S. PATENT DOCUMENTS

| | | | |
|---|---|---|---|
| 1,476,682 | 12/1923 | Beckmann | 206/813 X |
| 2,039,442 | 5/1936 | Mulford | 206/423 X |
| 2,722,778 | 11/1955 | Carufel | 206/423 X |
| 3,049,224 | 8/1962 | Fredette et al. | 206/813 X |
| 3,058,585 | 10/1962 | Budd | 206/423 |
| 3,284,949 | 11/1966 | Park | 47/84 |
| 3,314,194 | 4/1967 | Halleck | 47/84 |
| 3,650,386 | 3/1972 | Tigner | 206/813 X |
| 3,675,844 | 7/1972 | Sorrell | 206/813 X |
| 3,704,545 | 12/1972 | Van Reisen | 206/423 X |
| 3,961,444 | 6/1976 | Skaife | 47/84 |

FOREIGN PATENT DOCUMENTS

| | | | |
|---|---|---|---|
| 1,272,215 | 7/1968 | Germany | 206/423 |
| 2,027,851 | 12/1971 | Germany | 47/84 |
| 455,630 | 7/1968 | Switzerland | 206/423 |

*Primary Examiner*—E. H. Eickholt
*Attorney, Agent, or Firm*—Julian C. Renfro

[57] ABSTRACT

A low cost arrangement for displaying a small, rooted plant in a highly attractive manner, with such arrangement also serving as a moisture-retaining shipping container for the plant. The construction of the container is such that without modification from the mode used for displaying the plant, it can serve to hold the plant and a small quantity of associated earth in a safe and intact condition throughout a shipping procedure. This invention also includes a novel method of packaging a small living plant for display and/or shipment at minimal cost.

13 Claims, 5 Drawing Figures

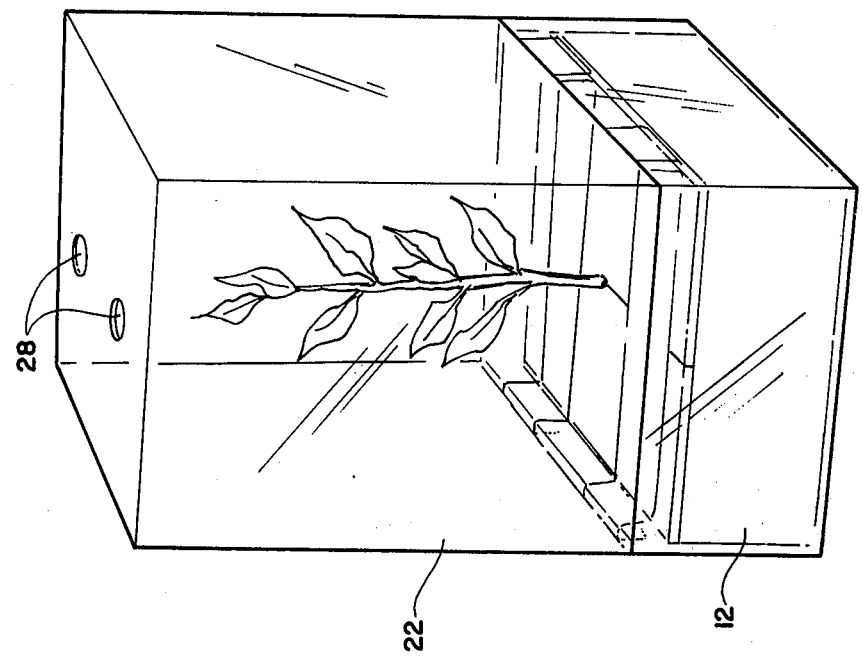
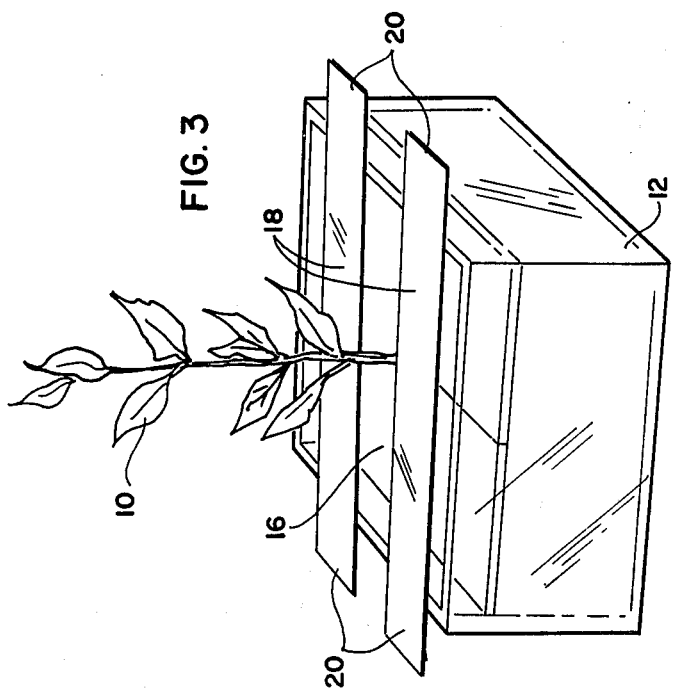
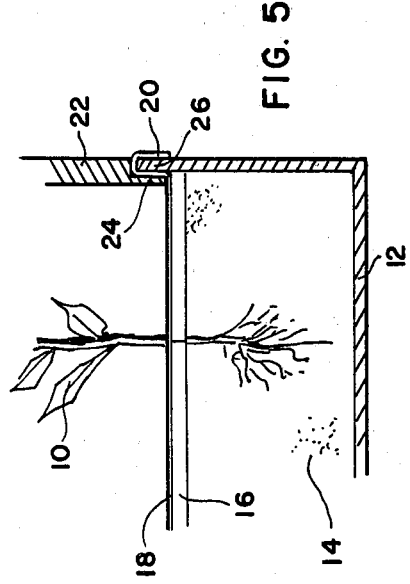

CONTAINER FOR SAFELY RETAINING A LIVING PLANT DURING TRANSIT AND DISPLAY

BACKGROUND OF THE INVENTION

It has long been known that small, living plants can be packaged and shipped in commerce, but unforturnately, in most such instances, either the packaging arrangement has been so expensive as to make such enterprises not feasible, or else the packages have been so insubstantial that the shocks and jolts encountered during shipping are so disruptive of the plant and its root system as to prevent the plant reaching its destination in a live and healithy condition.

Various efforts have been made to design lightweight, inexpensive shipping containers, including the use of bags made of thin walled plastic. However, in each known instance, these and other such arrangements have not been sufficiently sturdy as to assure safe arrival of plants, and the plants frequently needed attention during transit if loss was to be prevented.

Additionally, the shipping containers of the past have been quite unsatisfactory insofar as display of a plant to a potential customer was concerned, which of course meant that the packaging mode of a plant had to be entirely changed from the condition in which it was being displayed, in order to place it in a proper form for shipment. It was for reasons of the substantial limitations of these prior art arrangements that I was caused to make a careful study of packaging arrangements that would enable a more or less conventional box arrangement to serve as a display device, as well as a low cost, highly effective shipping container.

SUMMARY OF THE INVENTION

In accordance with this invention, I have evolved a most attractive and effective, yet inexpensive shipping arrangement, as will enable a small, rooted plant to be shipped for long distances, with no special care being required during transit, and with it being virtually assured that the plant will arrive at its destination in a live and healthy condition.

The novel arrangement I utilize typically involves a two-piece plastic box generally in the configuration of a rectangular solid, with the top and bottom portions arranged to interfit tightly, and with the bottom of the box typically being of less height than the top. Into the bottom of the box are placed the roots of the plant as well as a comparatively small quantity of earth or other planting material, with only a small amount of effort being involved in pressing the earth tightly enough around the roots as to assure that the plant is caused to stand in an upright position.

Thereafter, a pad such as of plastic foam of a size that will entirely cover the surface of the planting material in the bottom of the box, is placed in the box, with there being an arrangment such that the stem of the plant can be accomodated. This typically takes the form of a slot extending from one side of the pad to approximately the middle portion thereof in order that the plant's stem will not be interfered with. Preferably, I utilize a pad of plastic material that will retain the moisture of the earth quite well, and furthermore I use a pad that is slightly oversize, to increase the capability of properly retaining the earth in the bottom of the box.

Quite obviously, the placement of the piece of plastic foam on the earth in the bottom of the box would not be sufficient in and of itself to prevent dislodgement of the earth during shipping, so to that end I provide securing means for holding the pad in such a relationship to the planting material and to the bottom of the box as to prevent any degree of displacement of the earth or the plant, even should the box be turned upside down.

After considerable experimentation, I have found that strips of clear cellophane tape, such as "scotch" tape, can serve quite well in not only securing the plastic pad in an earth-retaining configuration, but also the ends of these tape strips can further serve to enhance the retention of the top of the box in a desired, assembled relationship to the bottom of the box, as will provide protection for the stem and leaf portions of the plant during shipping. This box securing arrangement is brought about by the fact that the lower edge of the top of the box is preferably designed to fit inside the upper edge of the bottom of the box, and the extending ends of the tape, when caused to conform to the upper edge of the bottom of the box during the closure procedure, help serve to effectively hold the box portions together.

Because of my novel earth-retention arrangement, the loss of moisture from the planting material is successfully prevented, thus making it possible for the plant to endure without additional moisture for a period of many weeks and still remain in a healthy enough condition as to thereafter be able to be transplanted to a larger container.

It is therefore a principal object of this invention to provide a novel, attractive, and highly effective technique for enabling a small, rooted plant to be easily packaged for shipment in commerce, with the packaging arrangement being of such a nature as to assure that the plant will arrive at its destination in a healthy condition.

It is another object of my invention to provide a novel plant packaging technique that not only displays the plant in a most pleasing and attractive manner, but also serves as a highly effective, yet low cost shipping container for the plant. It is yet another object of this invention to provide a plant packaging technique enabling a rooted plant to be placed in earth or other planting material in a box, and then inexpensive means utilized for effectively preventing dislodgement of the earth or damage to the plant, even though the box be turned upside down or shaken.

It is still another object to provide a novel method of packaging a small, living plant for display as well as shipment in an attractive, low-cost container.

BRIEF DESCRIPTION OF THE DRAWINGS

FIG. 3 is a persective view similar to FIG. 2 showing the double sided tape strips positioned over the pad of FIG. 2.

FIG. 4 is a perspective view similar to FIG. 3 showing the addition of the enclosure top.

FIG. 5 is a partial sectional detail view showing the interfitting relationship of the top and bottom portions of the container.

DETAILED DESCRIPTION

Figure 1:
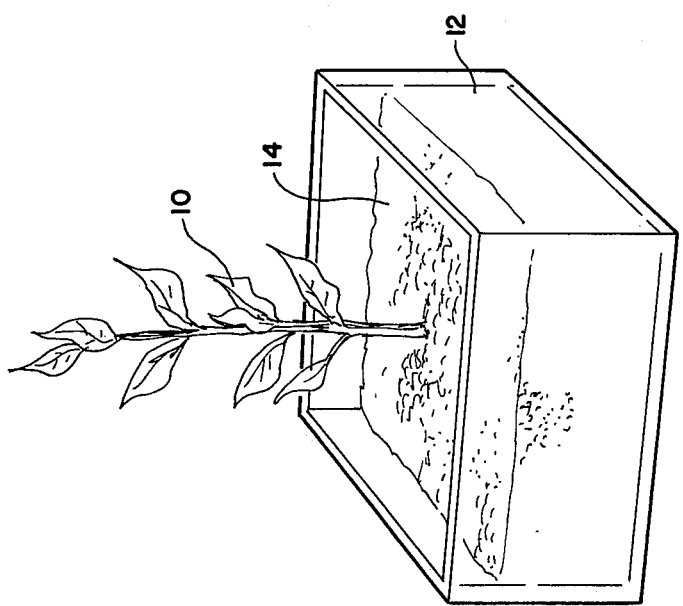
FIG. 1 is a perspective view of the uncovered container.

Turning to FIG. 1, it will there be seen that I have shown a small, rooted plant 10 disposed in the botton 12 of a box, such as of transparent plastic material. This portion of the box has four sides and a bottom, and is provided with and interfitting upper portion, as will be described hereinafter.

At such time as the plant is being planted in the bottom of the box, a sufficient amount of planting material 14 is added as to completely cover the roots, with the person concerned with the proper packaging of the plant using his or her fingers to press the material down somewhat tightly around the roots, as will cause the plant to stand in an upright position in approximately the center portion of the bottom of the box. Although I prefer to use earth as the planting material, I may also use certain mosses, as well as certain man-made materials.

Figure 2:
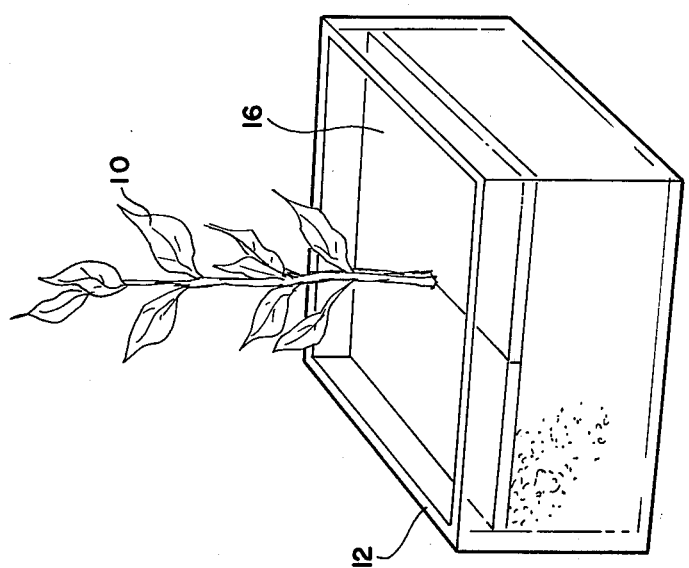
FIG. 2 is a perspective view similar to FIG. 1 showing the earth holding pad.

Quite obviously the pressing down of the earth would not, by itself, cause the earth to remain in the desired position should this portion of the box be inverted, so I utilize a pad 16, such as of polyethylene foam, to hold the earth in the desired position; note FIG. 2. It is necessary to configure the pad to accommodate the stem of the plant, such as by slotting it for approximately one half its width, with the end of such slot essentially coinciding with the center portion of the pad. In this way, the portions defining the sides of the slot can be pulled slightly apart so as to enable the stem of the plant to pass through and extend up from the center of the pad, as shown in FIG. 2. I prefer to utilize a square of plastic that is say ¼ inch oversize, for in that way it more effectively can retain the planting material in the bottom of the box, than would be the case if it were merely of a size to fit within the botton of the box. Quite importantly, the pad I use serves as a vapor barrier, for retaining moisture in the planting material, often for a period of several weeks.

Turning to FIG. 3, it will be seen that I have provided two strips of clear tape 18 for securing the pad used to cover the planting material in a proper material-retaining position. Since it is desired to hold the plastic 16 in the position shown, and to prevent dislodgement and scattering of the planting material, I cut the pieces of tape such that they are of a length greater than the left-right or lateral dimension of the bottom of the box, such that the ends 20 of the tape extend beyond the edges of the box, as revealed in this figure.

The securing of the pad in an earth-retaining relationship to the bottom of the box is not fully accomplished until the top 22 of the box is placed in position, as shown in FIG. 4. The top of the box is of a height such that it will permit a plant some two to two and one-half inches tall to stand upright, and be protected by the top of the box.

It is to be realized that the lower edge 24 of the top of the box preferably is configured to fit inside the upper edge 26 of the bottom of the box, as revealed in FIG. 5. As a result of this arrangement, upon the top of the box being pressed down into an interfitting relationship with the botton of the box, the overhanging ends 20 of the tape shown in FIG. 3 are caused to come into contact with the upper inner edge portions of the bottom of the box in the manner revealed in FIGS. 4 and 5, or in other words, the bottom edge of the top of the box causes a configuring of the tape edges along opposite upstanding edges of the bottom of the box, particularly as revealed in FIG. 4.

The top and botton portions 22 and 12 are preferably constructed so as to interfit snugly, but by the time the several tape ends become interfitted, the box edges fit together quite tightly. For that reason, no other sealing means need be used for holding the box portions together, even during shipment. However, should greater assurance be needed, I may use so-called "double faced tape," which will adhere not only to the upper edge portions of the bottom of the box, but also to the lower edge portions of the top of the box as well, and thus considerably increase the box sealing action.

Quite obviously I am not to be limited to a certain size box, but in a preferred embodiment, the bottom 12 of the box stood slightly more than 1¼ inches high, with a base portion approximately 2¼ inches square. The top 22 of the box in the preferred embodiment was approximately 3 inches high, and of course was 2¼ inches on a side.

I have found that a number of different types of plants can be packaged in accordance with my invention, shipped without special attention, and still be expected to arrive in a live, healthy condition. Quite surprisingly, the small amount of moisture in the soil at the time of packaging is sufficient to meet the needs of the plant for several weeks, for the plastic pad 16 serves as a vapor barrier, to effectively hold the moisture in the planting material.

Examples of different plant types that will endure for several weeks are coffee plants, parlor palms, cupid peperomia, nepthytis, and schefflera. These plants will do quite well, indoors or out, without the addition of water or fertilizers, but of course should be protected for freezing temperatures, or intense rays of the summer sun.

Optionally, I may utilize one or more holes 28 in the top of the box, for this prevents a buildup of moisture on the interior portions of the box top.

I claim:

1. A shipping and display arrangement for a small rooted plant comprising:
    a. a box of transparent material having separate top and bottom portions, said portions each being equipped with interfitting edge members.
    b. planting material as well as the roots of the plant, disposed in the bottom portion of said box,
    c. a pad covering the planting material, for retaining same in the bottom portion of the box,
    d. at least one strip of tape for securing said pad to the bottom portion of said box, with the ends of said strip of tape extending out between said interfitting edge members,
    e. the interception of said tape ends by said interfitting edge members causing adherent portions of tape to adhere tightly to the bottom portion of the box, thus to prevent displacement of the pad and the planting material during transit.

2. The shipping and display arrangement as defined in claim 1 wherein said pad is of soft plastic material, that is configured to accommodate the stem of the plant.

3. The shipping and display arrangement as defined in claim 1 wherein said top portion of the box is of sufficient height to accommodate a small plant.

4. An arrangement for enabling a living plant to be displayed as well as shipped utilizing the same low cost container, comprising a container having interfitting top and bottom portions, said bottom portion being adapted to receive a small quantity of planting material as well as the roots of a living plant, a pad for covering the planting material and being cnfigured to accommodate the stem of the plant, at least one strip of tape of greater length than the lateral dimension of the bottom of the box, such that the ends of the strip or strips of tape can extend beyond the confines of the bottom of the box, the top portion of said box being of a height to accomodate a plant set out in the bottom of the box, and having lower edge members that tightly interfit with the upper edge members of the bottom portion of the box, the edge members of the top portion of said box intercepting the tape ends when the box portions are interfitted, causing them to move into adhering contact with edge portions of the bottom of the box, and hold said pad tightly in a planting material-retaining position, the presence of such tape ends further enhancing the interfit of the top and bottom box portions.

5. The arrangement as defined in claim 4 in which the top and bottom box portions are of transparent material.

6. The arrangement as defined in claim 4 wherein the lower edge members of the top portion of the box fit inside the upper edge members of the bottom portions of the box.

7. The arrangement as defined in claim 4 in which the tape has adherent material on only one side.

8. The arrangement as defined in claim 4 in which double faced tape is utilized, with adherent material used on both faces.

9. The arrangement as defined in claim 4 in which the pad for covering the planting material is of plastic foam.

10. A method of packaging a small, living plant for display as well as shipment, utilizing a box having a bottom and an interfitting top, comprising the steps of placng a small quantity of planting material as well as the root portions of the plant in the bottom of the box, placing a pad to serve as a covering for the planting material in the bottom of the box, with such pad being configured to permit the plant to reside without interference in approximately the center of the box, applying at least one strip of tape to the upper surface of the pad, with each such strip of tape being of greater length than the lateral dimension of the bottom of the box, as will permit each end of each strip of tape to extend somewhat beyond the bottom of the box, and thereafter placing the top and bottom portions of the box together, with the lower portions of the box top coming into direct contact with the overhanging tape ends and causing them to tightly adhere to the upper edges of the bottom of the box, and thus hold the pad of covering material such that it will prevent dislodgement of the planting material, with such tape ends additionally serving to increase the tightness of the interfit of the top and bottom box portions.

11. The method as defined in claim 10 in which the top and bottom box portions are of transparent material.

12. The method as defined in claim 10 in which the tape has adherent material on only one side.

13. The method as defined in claim 10 in which double faced tape is utilized, with adherent material used on both sides.

* * * * *